United States Patent
Nagatoshi et al.

(10) Patent No.: US 9,763,052 B2
(45) Date of Patent: Sep. 12, 2017

(54) TERMINAL DEVICE AND COMMUNICATION METHOD

(71) Applicant: FUJITSU LIMITED, Kawasaki-shi, Kanagawa (JP)

(72) Inventors: Hideyuki Nagatoshi, Kawasaki (JP); Masaki Mukouchi, Machida (JP); Takuro Saito, Kawasaki (JP); Seijun Tanikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/139,443

(22) Filed: Apr. 27, 2016

(65) Prior Publication Data

US 2016/0242006 A1    Aug. 18, 2016

Related U.S. Application Data

(63) Continuation of application No. PCT/JP2013/079139, filed on Oct. 28, 2013.

(51) Int. Cl.
*H04W 4/02* (2009.01)
*H04W 36/00* (2009.01)

(52) U.S. Cl.
CPC ............ *H04W 4/025* (2013.01); *H04W 4/02* (2013.01); *H04W 36/0061* (2013.01)

(58) Field of Classification Search
CPC .... H04W 4/025; H04W 36/0061; H04W 4/02
See application file for complete search history.

(56) References Cited

U.S. PATENT DOCUMENTS

| | | | |
|---|---|---|---|
| 6,351,647 B1* | 2/2002 | Gustafsson | H04W 4/02 455/414.3 |
| 2007/0005363 A1* | 1/2007 | Cucerzan | H04W 4/02 704/256 |

(Continued)

FOREIGN PATENT DOCUMENTS

| | | |
|---|---|---|
| JP | 2000-165952 | 6/2000 |
| JP | 2008-104029 | 5/2008 |

(Continued)

OTHER PUBLICATIONS

International Search Report and Written Opinion of the International Searching Authority (Form PCT/ISA/210, Form PCT/ISA/237), mailed in connection with PCT/JP2013/079139 and dated Jan. 28, 2014 (6 pages).

*Primary Examiner* — Chuong A Ngo

(74) *Attorney, Agent, or Firm* — Fujitsu Patent Center

(57) ABSTRACT

A terminal device includes a processor and a memory storing a program that, when executed by the processor, causes the terminal device to receive the broadcast information of a radio base station currently in communication with the terminal device, store location information included in the received broadcast information in a first storage part, and transmit the location information stored in the first storage part to a management apparatus connected to the radio base station through a network. The terminal device is caused to transmit the location information stored in the first storage part when the radio base station currently in communication with the terminal device is switched from a first radio base station to a second radio base station and location information is absent in the broadcast information of the second radio base station received by the terminal device.

13 Claims, 13 Drawing Sheets

(56) References Cited

U.S. PATENT DOCUMENTS

2009/0085806 A1    4/2009   Piersol et al.
2009/0233574 A1    9/2009   Shinozaki
2010/0317390 A1   12/2010   Rekimoto

FOREIGN PATENT DOCUMENTS

JP     2009-089396    4/2009
JP     2009-225015   10/2009

\* cited by examiner

FIG.7A

| CURRENT BASE STATION INFORMATION | ID1,X1,Y1 |
|---|---|
| PAST BASE STATION INFORMATION | -,-,- |

FIG.7B

| CURRENT BASE STATION INFORMATION | ID2,X1,Y1 |
|---|---|
| PAST BASE STATION INFORMATION | ID1,X1,Y1 |

FIG.7C

| CURRENT BASE STATION INFORMATION | ID3,X3,Y3 |
|---|---|
| PAST BASE STATION INFORMATION | ID2,X1,Y1 |

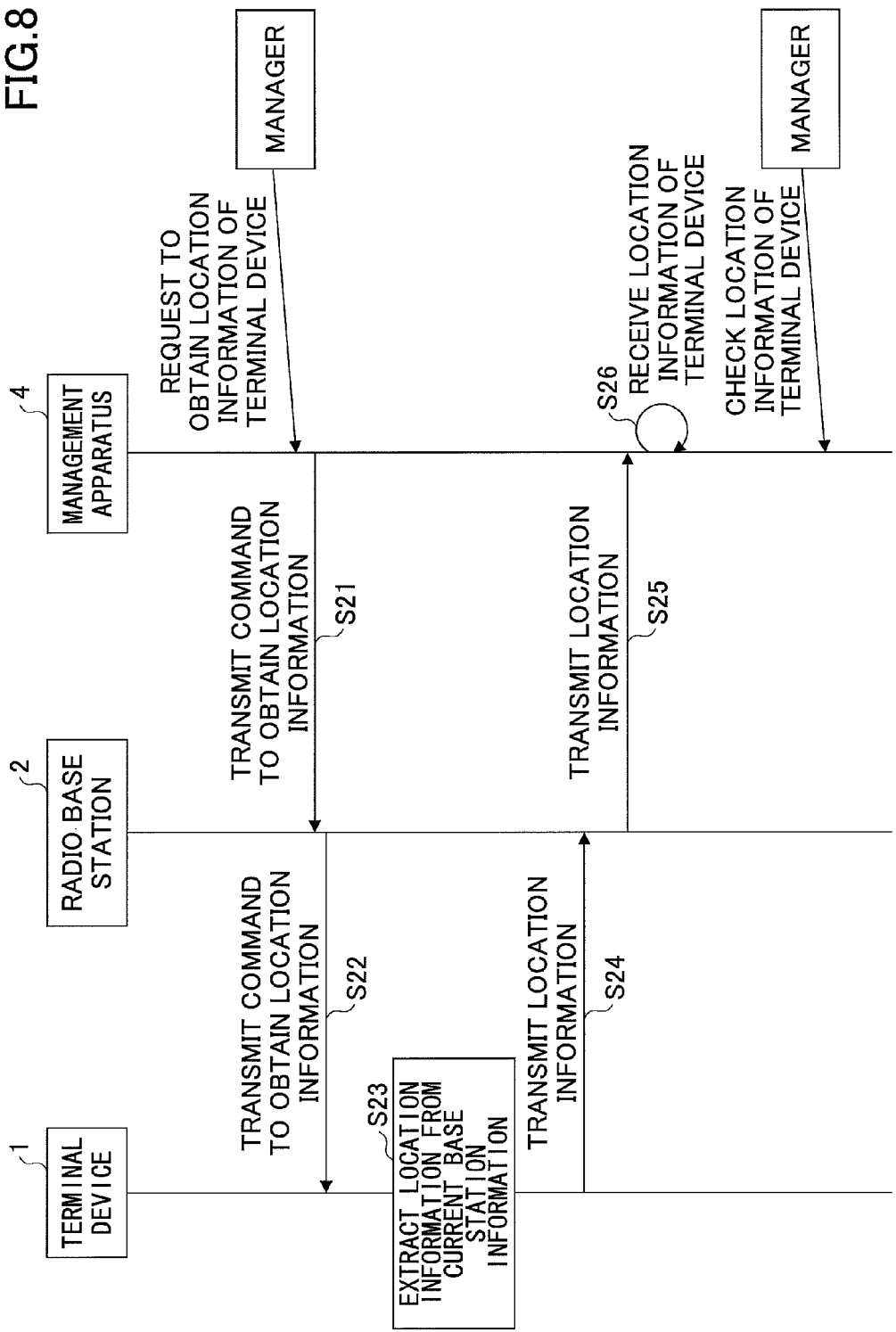

FIG.12A

| BASE STATION ID | LOCATION INFORMATION |
|---|---|
| ID1 | X1,Y1 |
| ID3 | X3,Y3 |

| BASE STATION ID | LOCATION INFORMATION |
|---|---|
| ID1 | X1,Y1 |
| ID3 | X3,Y3 |
| ID2 | X1,Y1 |

| BASE STATION ID | LOCATION INFORMATION |
|---|---|
| ID1 | X1,Y1 |
| ID3 | X3,Y3 |
| ID2 | X1,Y1 |

| CURRENT BASE STATION INFORMATION | ID1 |
|---|---|
| PAST BASE STATION INFORMATION | – |

1221 (current), 1222 (past)

FIG.13B

| CURRENT BASE STATION INFORMATION | ID2 |
|---|---|
| PAST BASE STATION INFORMATION | ID1 |

1221 (current), 1222 (past)

FIG.13C

| CURRENT BASE STATION INFORMATION | ID3 |
|---|---|
| PAST BASE STATION INFORMATION | ID2 |

1221 (current), 1222 (past)

… (1)

TERMINAL DEVICE AND COMMUNICATION METHOD

CROSS-REFERENCE TO RELATED APPLICATION

This application is a continuation application of International Application PCT/JP2013/079139, filed on Oct. 28, 2013, and designating the U.S., the entire contents of which are incorporated herein by reference.

FIELD

A certain aspect of the embodiments discussed herein is related to terminal devices and communication methods.

BACKGROUND

There is a location storage device that includes a storage part in which the location information of each base station that communicates with a radio terminal and base station identification information uniquely assigned to each base station are recorded in correlation with each other, and a reception part that measures the signal strength of a signal received by the radio terminal.

The location storage device further includes a recordation determination part that refers to the base station identification information recorded in the storage part and determines whether the base station identification information included in a signal received by the reception part is recorded in correlation with the location information in the storage part, and a recordation part that records the base station identification information determined as not being recorded in the storage part by the recordation determination part in correlation with predetermined location information according to the location information of the radio terminal. (See, for example, Japanese Laid-open Patent Publication No. 2008-104029.)

SUMMARY

According to an aspect of the embodiments, a terminal device includes a processor and a memory storing a program that, when executed by the processor, causes the terminal device to receive the broadcast information of a radio base station currently in communication with the terminal device, store location information included in the received broadcast information in a first storage part, and transmit the location information stored in the first storage part to a management apparatus connected to the radio base station through a network. The terminal device is caused to transmit the location information stored in the first storage part when the radio base station currently in communication with the terminal device is switched from a first radio base station to a second radio base station and location information is absent in the broadcast information of the second radio base station received by the terminal device.

The object and advantages of the embodiments will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

FIGS. 7A through 7C are diagrams depicting examples of base station information stored in a first storage part and a second storage part;

FIG. 8 is a sequence diagram depicting a procedure for obtaining location information;

FIGS. 12A through 12C are diagrams depicting a transition of information stored in the management table; and FIGS. 13A through 13C are diagrams depicting a transition of the IDs of the radio base station stored in a communication control part of a terminal device.

DESCRIPTION OF EMBODIMENTS

According to conventional techniques such as the above-described location storage device, if broadcast information from a radio base station does not include location information as in the case of, for example, a radio base station that is temporarily set up, it is impossible to determine an approximate current location of a terminal device.

According to an aspect of the invention, it is possible to determine an approximate current location of a terminal device even in the case of communicating with a radio base station whose broadcast information does not include location information.

Preferred embodiments of the present invention will be explained with reference to accompanying drawings.

[a] First Embodiment

A communication system described in a first embodiment includes a radio base station capable of broadcasting its own location information to terminal devices like radio base stations that communicate with mobile communication terminal devices such as cellular phones or Personal Handyphone System (PHS) terminal devices.

Figure 1:
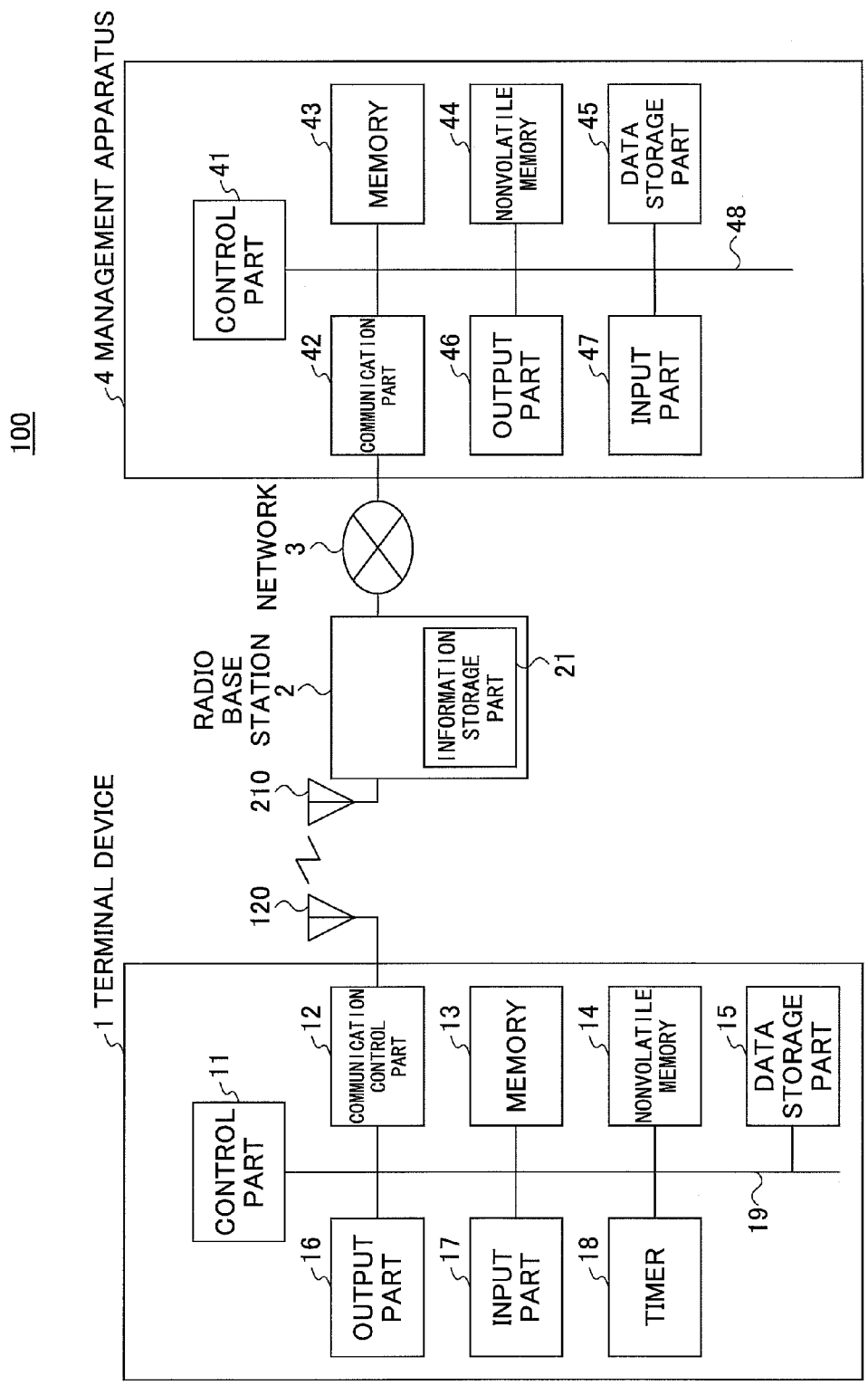
FIG. 1 is a diagram depicting a hardware configuration of a communication system according to a first embodiment.

FIG. 1 is a diagram depicting a hardware configuration of a communication system according to the first embodiment. Referring to FIG. 1, a communication system 100 includes a terminal device 1, radio base stations 2, and a management apparatus 4 connected to the radio base stations 2 via a network 3 such as the Internet. For simplification of description, only one radio base station 2 is depicted in FIG. 1. Hereinafter, the radio base stations 2 may be collectively referred to as "radio base station 2" when, for example, a structure or operation common to the radio base stations 2 is described and no distinction is made between the radio base stations 2.

The terminal device 1 performs radio communications with the radio base station 2. Examples of radio communications employed according to this embodiment include mobile communications compliant with standards set by the International Telecommunication Union (ITU), such as 3G (Generation) and 4G (such as Long Term Evolution [LTE]) communications. Examples of the terminal device 1 include cellular phones, PHS terminals, smartphones, tablet terminals, and notebook personal computer (PC)s. The terminal device 1 moves as a mobile terminal, and performs radio communications with the radio base station 2 available at a destination to which the terminal device 1 moves.

The terminal device 1 is a computer system that includes a control part 11, a communication control part 12, a memory 13, a nonvolatile memory 14, a data storage part 15, an output part 16, an input part 17, and a timer 18, all of which are interconnected by a bus 19 that is also included in the computer system.

The control part 11 is, for example, a central processing unit (CPU) that operates as the main controller of the terminal device 1. For example, a processor that includes a program counter, an instruction decoder, various arithmetic logic units, a load-store unit (LSU), and general-purpose registers may be used as the CPU.

The control part 11 executes a program that controls operations of the terminal device 1. The program is, for example, stored in the nonvolatile memory 14 or the data storage part 15 and read into the memory 13. The program read into the memory 13 is executed by the control part 11.

Figure 2:
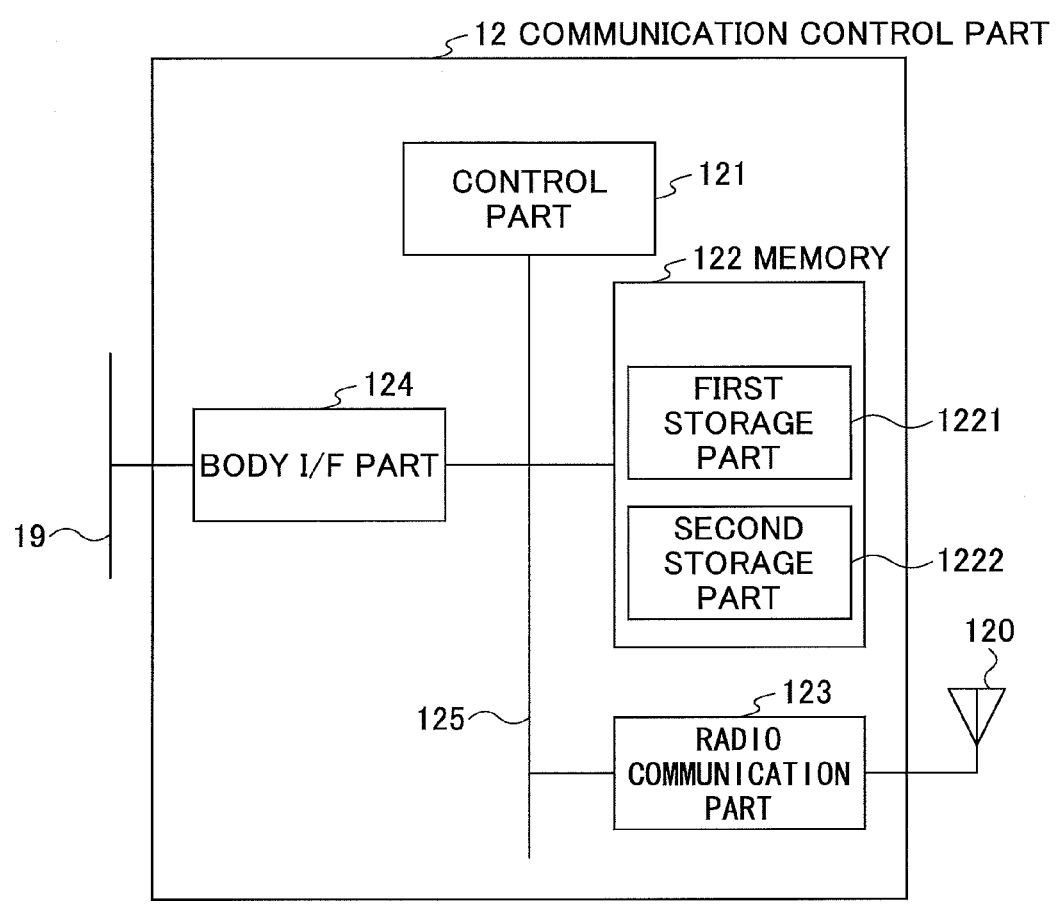
FIG. 2 is a diagram depicting a hardware configuration of a communication control part.

The communication control part 12 is connected to a radio antenna 120 to control radio communications. The details of the communication control part 12 are described with reference to FIG. 2. FIG. 2 is a diagram depicting a hardware configuration of the communication control part 12 according to the first embodiment.

Referring to FIG. 2, the communication control part 12 includes a control unit 121, a memory 122, a radio communication part 123, and a body interface (I/F) part 124, all of which are interconnected by a bus 125 that is also included in the communication control part 12. The communication control part 12 may further includes the radio antenna 120. Furthermore, the communication control part 12 may be connected to the bus 19 as a card for radio communications.

Examples of the radio antenna 120 include a dipole antenna, a monopole antenna, and a planar inverted-F antenna.

The control unit 121 controls the communication control part 12 independent of the control part 11 that is the main controller of the terminal device 11. A CPU that is the same as the CPU of the control part 11 may be used for the control unit 121. The control unit 121 executes a program stored in the memory 122. The details of the program executed by the control unit 121 are described below with reference to FIG. 3.

The communication control part 12 may operate or be fed with electric power independent of the control part 11 that is a main controller. For example, when the terminal device 1 is in power saving mode so that the control part 11 is in sleep mode, it is possible to perform radio communications while reducing power consumption by causing the communication control part 12 to operate independently. The CPU is in sleep mode when, for example, the CPU is not in operation or the functions of the CPU are partly restricted for power saving purposes. For example, the control part 11 may be in sleep mode when the terminal device 1 is not in operation so that the operational load on the control part 11 is light as in the case of waiting for communications. The control unit 121 may wake up the control part 11 in sleep mode (cancel the sleep mode of the control part 11) when receiving radio communications through the radio antenna 120.

The memory 122 stores a program that causes the communication control part 12 to operate. The memory 122 includes a first storage part 1221 and a second storage part 1222. The first storage part 1221 and the second storage part 1222 are address spaces provided in the memory 122. The address spaces of the memory 122 are managed by the control unit 121. The control unit 121 controls writing data to and reading data from the memory 122.

In the first storage part 1221 and the second storage part 1222, "location information" that specifies the radio base station 2 with which the terminal device 1 communicates through the radio antenna 120 is stored as base station information. The location information is included in broadcast information transmitted from each radio base station 2. The broadcast information includes unique identification information for identifying each radio base station 2.

The radio communication part 123 is connected to the radio antenna 120 to control radio communications. Examples of radio communications according to this embodiment include communications such as 3G, 4G, and WiMAX (Worldwide Interoperability for Microwave Access) communications. As radio communications control operations, for example, the operation of controlling a handoff (handover) process in which the terminal device 1 moves and searches out a new radio base station 2 as a communication destination and switches with the new radio base station 2 and the operation of controlling frequency channels according to the communication system of the radio base station 2 are performed.

The body I/F part 124 connects the bus 125 of the communication control part 12 and the bus 19 of the controller 11. The body I/F part 124 exchanges, for example, information such as voice and data transmitted and received in radio communications with the bus 19.

Referring back to FIG. 1, the memory 13 is, for example, a random access memory (RAM). The nonvolatile memory 14 is, for example, a read-only memory (ROM). The data storage part 15 is, for example, a hard disk drive. A program that controls operations of the terminal device 1 may be stored in the nonvolatile memory 14 or the data storage part 15. The program stored in the nonvolatile memory 14 or the data storage part 15 may be read into and stored in the memory 13 to be executed by the control part 11.

Examples of the output part 16 include a liquid crystal display panel, a lamp, and a loudspeaker for outputting voice. The output part 16 notifies a user of the terminal device 1 of visual information and/or audio information. Examples of the input part 17 include a keyboard, a touchscreen, and a microphone for inputting voice. Operation information and voice information from the user of the terminal device 1 are input to the input part 17. The timer 18 operates as, for example, a watchdog timer that monitors operations of the terminal device 1 and a timer for timekeeping, such as a real time clock (RTC).

The radio base station 2 includes a radio antenna 210, and performs radio communications with the terminal device 1. The radio base station 2 relays communications between the terminal device 1 and the management apparatus 4 via the network 3.

The radio base station 2 has a coverage (communication area) according to its output of radio waves. Multiple radio base stations 2 are installed so that their respective coverages overlap each other to cover a wide communication range. When the terminal device 1 moves to visit the coverages of the radio base stations 2 one after another, the communication system 100 executes a handoff process that switches the communication destination of the terminal device 1 from one radio base station 2 to another radio base station 2. That is, the communication system 100 controls the switching of coverages.

The radio base station 2 includes an information storage part 21. Base station information that specifies the radio base station 2 is stored in the information storage part 21. The base station information includes, for example, unique identification information (ID) for identifying the radio base station 2 and the location information (for example, longitude and latitude information) of the radio base station 2.

The radio base station 2 broadcasts the base station information stored in the information storage part 21 to the terminal device 1 as broadcast information at predetermined time intervals. When receiving the broadcast information from multiple radio base stations 2, the terminal device 1 determines radio wave conditions based on the information of the radio wave strength of the received broadcast information, and registers the terminal device 1 with the radio base station 2 of a good radio wave condition.

In the case of moving from one coverage to another of the radio base stations 2, the terminal device 1 switches the registration destination, that is, the radio base station 2 with which to register the terminal device 1, from one radio base station 2 to another by searching out the radio base station 2 of a good radio wave condition in accordance with the movement. This switching of the radio base station 2 serving as a registration destination enables a handoff process without interruption of communications.

The terminal device 1 communicates with, through the radio base station 2, the management apparatus 4 connected to the network 3. According to embodiments, the "management apparatus" is an apparatus that receives location information from the terminal device 1, and may also have other functions. The management apparatus 4 transmits a predetermined command to the terminal device 1, and makes a request to obtain the location information of the radio base station 2 with which the terminal device 1 is currently in communication (hereinafter also referred to as "radio base station 2 currently in communication"). In response to the request to obtain the location information, the terminal device 1 transmits the location information to the management apparatus 4.

The management apparatus 4 manages the location information of the terminal device 1. The management apparatus 4 includes a control part 41, a communication part 42, a memory 43, a nonvolatile memory 44, a data storage part 45, an output part 46, and an input part 47, all of which are interconnected by a bus 48 that is also included in the management apparatus 4. Like the terminal device 1, the management apparatus 4 is a computer system that is composed of the control part 41 and its peripheral hardware items.

The control part 41 executes a program stored in the memory 43 to control the management apparatus 4. The communication part 42 communicates with the radio base station 2 through the network 3. The memory 43 is, for example, a RAM. The nonvolatile memory 44 is, for example, a ROM. The data storage part 45 is, for example, a hard disk drive.

A program that controls operation of the management apparatus 4 may be stored in the nonvolatile memory 44 or the data storage part 45. The program stored in the nonvolatile memory 44 or the data storage part 45 may be read into and stored in the memory 43 to be executed by the control part 41. Alternatively, an address accessible by the control part 41 may be assigned to the nonvolatile memory 44, and the control part 41 may directly executes the program stored in the nonvolatile memory 44.

Location information obtained from the terminal device 1 is stored in the nonvolatile memory 44 or the data storage part 45. The stored location information may be used by applications and other devices (not depicted) of the management apparatus 4.

Examples of the output part 46 include a liquid crystal display panel, a lamp, and a loudspeaker for outputting voice. The output part 46 outputs visual information and/or audio information to a user of the management apparatus 4 and notifies the user of the information. Examples of the input part 47 include a keyboard, a touchscreen, and a microphone for inputting voice. Operation information and voice information from the user of the management apparatus 4 are input to the input part 47.

Figure 3:
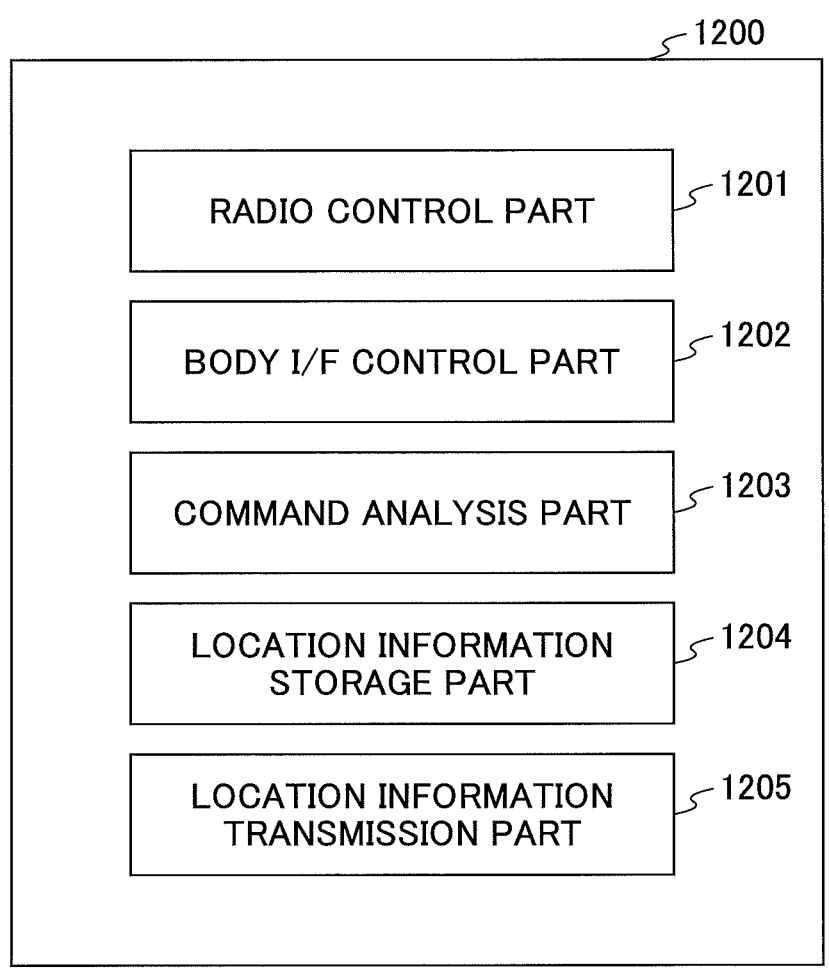
FIG. 3 is a block diagram depicting a software configuration of the communication control part.

Next, a communication program executed by the communication control part 12 of the terminal device 1 is described in detail with reference to FIG. 3. FIG. 3 is a block diagram depicting a software configuration of the communication control part 12 according to the first embodiment.

A radio communication program 1200 depicted as an example of the communication program in FIG. 3 is stored in the memory 122 and executed by the control unit 121 of FIG. 2. The radio communication program 1200 includes a radio control part 1201, a body I/F control part 1202, a command analysis part 1203, a location information storage part 1204, and a location information transmission part 1205, all of which are implemented by software modules.

Software modules represent software functions, and may be implemented in the form of either a single file or multiple files in order to implement the functions. Furthermore, the functions of the software modules of the radio communication program 1200 may be, for example, implemented as middleware on the hardware of the communication control part 12.

The radio control part 1201 controls, for example, radio communications compliant with a communication protocol such as 3G, 4G, or WiMAX, using the radio communication part 123.

The body I/F control part 1202 controls the interface with the control part 11 through the bus 19, using the body I/F part 124.

The command analysis part 1203 analyzes a predetermined command received from the management apparatus 4 via the radio base station 2.

The location information storage part 1204 obtains location information from the broadcast information received from the radio base station 2, and stores the obtained location information in the first storage part 1221 as the location information of the radio base station 2 currently in communication. Furthermore, when the terminal device 1 moves so that the radio base station 2 with which the terminal device 1 communicates switches by a handoff process, the location information storage part 1204 copies the location information stored in the first storage part 1221 to the second storage part 1222 to store the location information in the second storage part 1222 as the location information of the radio base station 2 with which the terminal device 1 communicated in the past (hereinafter also referred to as "radio base station 2 of past communications").

The location information transmission part 1205 transmits the location information stored in the first storage part 1221 to the management apparatus 4 when a command to obtain location information is included in the command received from the management apparatus 4 and analyzed by the command analysis part 1203. The location information transmission part 1205 may also transmit the location information stored in the second storage part 1222 in addition to the location information stored in the first storage part 1221.

Figure 4:
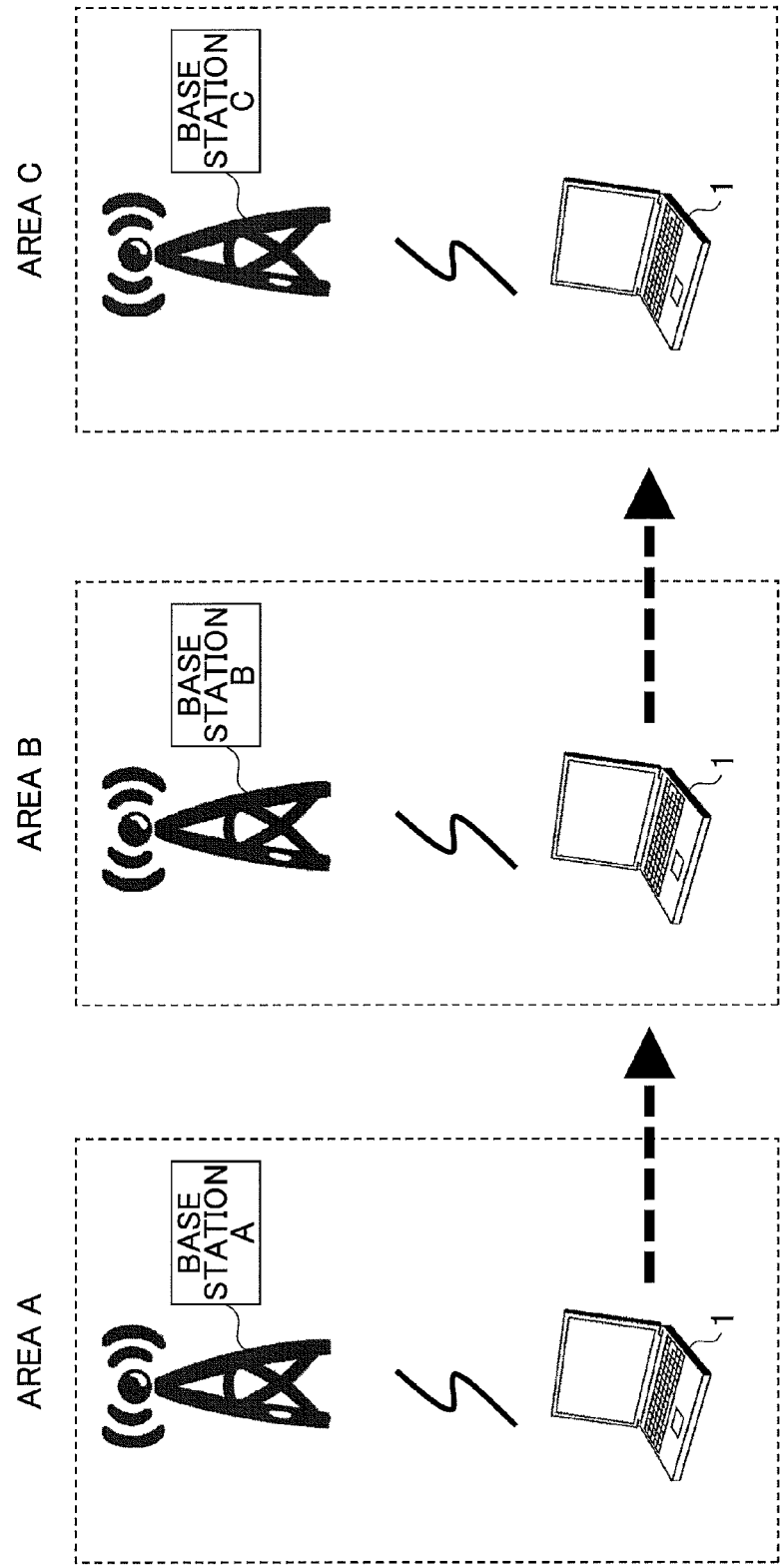
FIG. 4 is a diagram depicting a movement of a terminal device through coverages.
Figure 5:
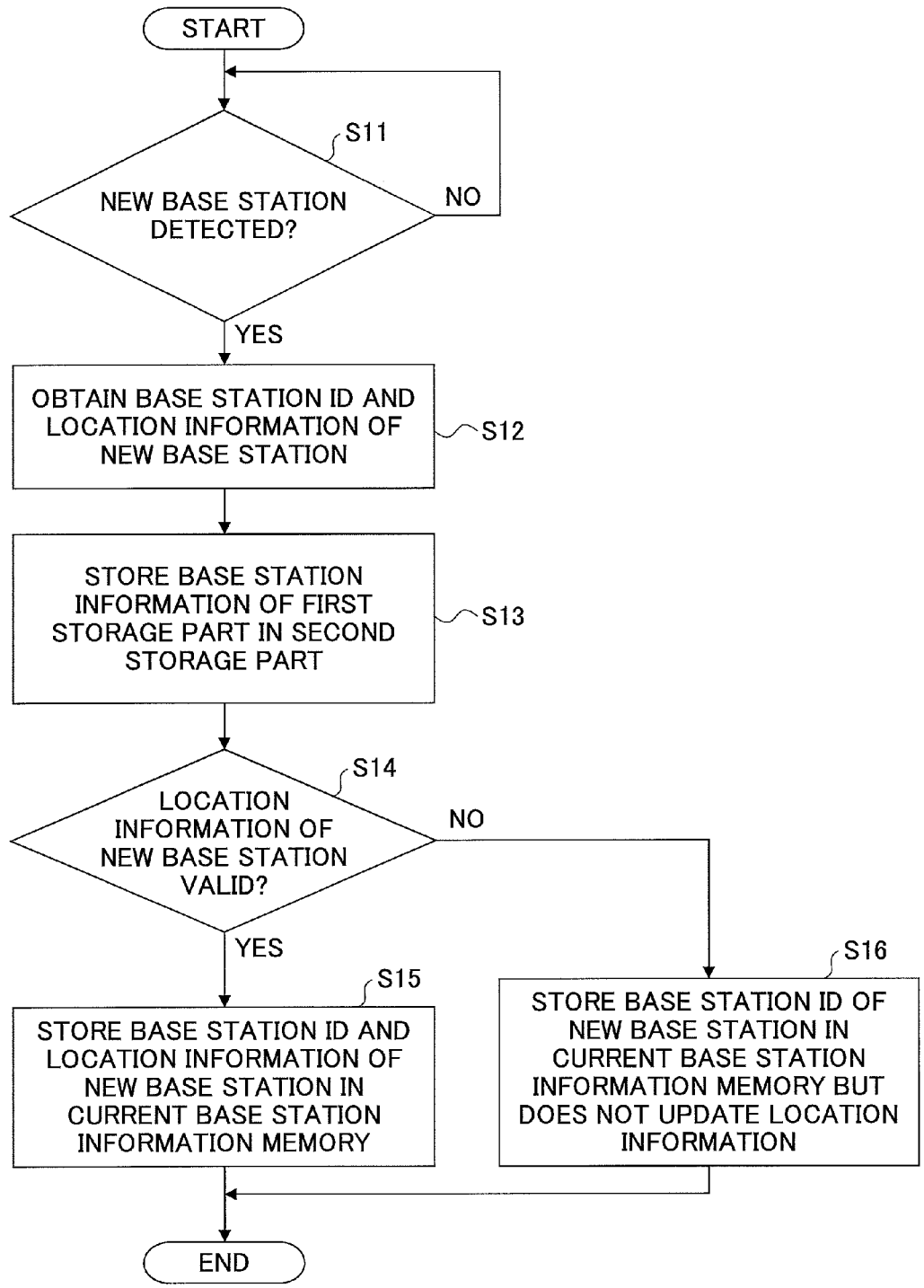
FIG. 5 is a flowchart depicting an operation of the communication control part.
Figure 6:
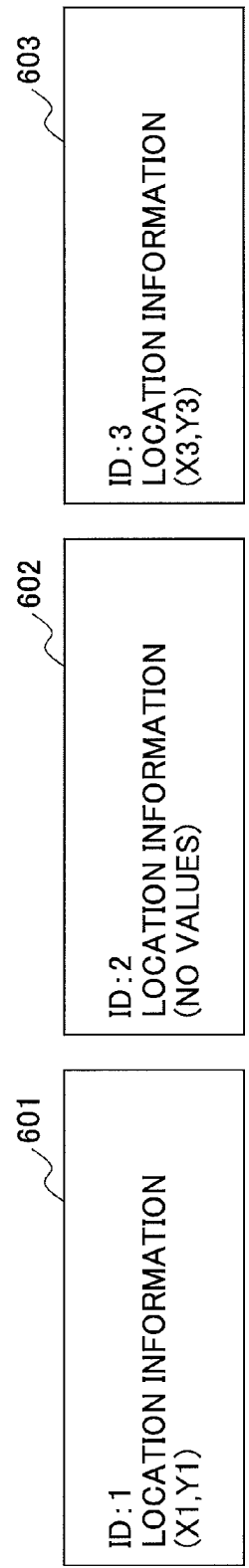
FIG. 6 is a diagram depicting examples of base station information transmitted from a radio base station.

Next, a transition of base station information stored in the first storage part 1221 and the second storage part 1222 in the case where the terminal device 1 moves through the coverages of multiple radio base stations 2 according to the first embodiment is described with reference to FIGS. 4 through 7C. FIG. 4 is a diagram depicting a movement of the terminal device 1 through coverages. FIG. 5 is a flowchart depicting an operation of the communication control part 12. FIG. 6 is a diagram depicting examples of base station information transmitted from the radio base station 2. FIGS. 7A through 7C are diagrams depicting examples of base station information stored in the first storage part 1221 and the second storage part 1222.

Referring to FIG. 4, Base Station A, Base Station B, and Base Station C are radio base stations 2 that have Area A, Area B, and Area C as their respective coverages. Here, it is assumed that the terminal device 1 moves from Area A to Area B and further to Area C. While the coverages are depicted as separate areas in FIG. 4, adjacent coverages overlap each other so that a handoff process that prevents interruption of communications during the movement of the terminal device 1 is executed.

Next, an operation of the communication control part 12 of the terminal device 1 that is performed with the movement of the terminal device 1 through coverages depicted in FIG. 4 is described with reference to FIG. 5.

First, at step S11, the control unit 121 determines whether the radio control part 1201 detects a new radio base station 2 by receiving broadcast information. When a new radio base station 2 is detected (YES at step 11) and the communication destination is switched to the new radio base station 2, at step S12, the control part 121 obtains base station ID and location information included in the broadcast information of the new radio base station 2.

FIG. 6 depicts base station information stored in Base Station A, Base Station B, and Base Station C, which are examples of the radio base stations 2. Referring to FIG. 6, Base Station A stores base station information 601 that includes a base station ID "1" and location information in coordinates "(X1, Y1)." Base Station A broadcasts the base station information 601 to the terminal device 1 by including the base station information 601 in its broadcast information. Likewise, Base Station C stores base station information 603 that includes a base station ID "3" and location information "(X3, Y3)." Base Station C broadcasts the base station information 603 to the terminal device 1 by including the base station information 603 in its broadcast information.

Meanwhile, Base Station B is a movable radio base station that may be moved to, for example, an event site for temporal use. Base Station B stores base station information 602 that includes a base station ID "2" but no location information. Accordingly, the broadcast information transmitted by Base Station B includes a base station ID but no location information.

Referring back to FIG. 5, at step S13, the control unit 121 stores the obtained new base station information in the first storage part 1221 and stores the past base station information stored in the first storage part 1221 in the second storage part 1222.

FIGS. 7A through 7C depict a transition of the information stored in the first storage part 1221 and the second storage part 1222 of the terminal device 1. Referring to FIG. 7A, in the terminal device 1 that is in Area A of Base Station A, the base station information (ID "1", (X1, Y1)) of Base Station A currently in communication is stored in the first storage part 1221 as current base station information, but no information is stored in the second storage part 1222.

Referring to FIG. 7B, when the terminal device 1 enters Area B of Base Station B and receives broadcast information from Base Station B, the base station information of Base Station A stored in the first storage part 1221 is stored in the second storage part 1222 as past base station information. Meanwhile, the base station information (ID "2") of Base Station B currently in communication is stored in the first storage part 1221. Base Station B, however, does not have location information. Therefore, the last stored location information of Base Station A remains stored in the first storage part 1221 as location information.

Referring to FIG. 7C, when the terminal device 1 enters Area C of Base Station C and receives broadcast information from Base Station C, the base station ID of Base Station B and the location information of Base Station A that are stored in the first storage part 1221 are stored in the second storage part 1222 as past base station information. The base station information (ID "3", (X3, Y3)) of Base Station C currently in communication is stored in the first storage part 1221 as current base station information, thus updating the current base station information.

According to this embodiment, Base Station C is described as having location information. Alternatively, however, when Base Station C as well as Base Station B has no location information, the stored location information of Base Station A remains stored in the first storage part 1221.

According to this embodiment, by storing the history of the base station information of a radio base station 2 currently in communication and one or more radio base stations of past communications, it is possible to store the radio base stations 2 in association with each other.

By associating and storing the radio base stations 2, even when no location information is included in the broadcast information transmitted from the radio base station 2 currently in communication, it is possible to determine an approximate location of the terminal device 1 so that it is possible to obtain the location information of the terminal device 1 without interruption because the radio base station 2 currently in communication is close to the radio base station 2 of past communications.

By obtaining location information without interruption, it is possible to utilize location information in, for example, a system that utilizes the location information of a terminal device as a security check item.

Furthermore, according to this embodiment, when the radio base station 2 currently in communication has no location information, there is no need to increase the radio output of the terminal device 1 to obtain broadcast information from a neighboring radio base station 2 of a poor radio wave condition to obtain location information. Therefore, it is possible to reduce the power consumption of the terminal device 1.

Next, an internal procedure of the management apparatus 4 for obtaining the base station information stored in the terminal device 1 is described with reference to FIG. 8. FIG. 8 is a sequence diagram depicting a procedure for obtaining location information included in base station information.

Referring to FIG. 8, a manager who is a user of the management apparatus 4 inputs, from the input part 47 described with reference to FIG. 1, an instruction that requests obtaining of the location information of the terminal device 1. The inputting of the instruction may be performed by, for example, selecting a specific terminal device 1 from a list of terminal devices 1 that are objects of management displayed on the output part 46 and performing an operation for obtaining location information.

In response to the instruction from the manager, at step S21, the management apparatus 4 transmits a command to obtain location information to the radio base station 2. The radio base station 2 with which the terminal device 1 is communicating is selected by way of a base station management server (not depicted in the drawings). The base station management server is aware of the correspondence between terminal devices 1 and radio base stations 2 as a function of the communication system 100, and has the function of transmitting a command addressed to the terminal device 1 received from the management apparatus 4 to the radio base station 2 with which the terminal device 1 is currently in communication.

At step S22, the radio base station 2 transmits the command to obtain location information to the specified terminal device 1. In response to reception of the command to obtain location information, at step S23, the terminal device 1 extracts location information stored in the first storage part 1221, and at step S24, transmits the extracted location information to the radio base station 2. In response to reception of the location information from the terminal device 1, at step S25, the radio base station 2 transmits the received location information to the management apparatus 4.

At step S26, the management apparatus 4 receives the location information from the radio base station 2. Then, the management apparatus 4 notifies the manager of the location information of the terminal device 1 through the output part 46 based on the location information received from the radio base station 2. The manager 4 checks the location information of the terminal device 1, and ends this procedure.

By the above-described process (procedure), it is possible for the management apparatus 4 to obtain approximate location information of the terminal device 1 from the terminal device 1 without providing a special configuration in the base station management server in a cellular phone carrier system that is an example of the communication system 100, for example.

According to this embodiment, the location information that the management apparatus 4 may obtain from the terminal device 1 is the location information of the radio base station 2 that is broadcast to the terminal device 1 from the radio base station 2. Therefore, location information error depends on the size of the coverage of the radio base station. For example, in the case of a radio base station 2 having a small coverage, the location of the terminal device 1 is close to the location of the radio base station 2. Accordingly, the difference between the location information of the radio base station 2 and the actual location of the terminal device 1 is limited. Meanwhile, in the case of a radio base station 2 having a large coverage, there may be a large difference between the location information of the radio base station 2 and the actual location of the terminal device 1. It is possible, however, for the management apparatus 4 to easily obtain information as to which one of the coverages of the radio base stations 2 the terminal device is near.

Furthermore, according to this embodiment, as described with reference to FIG. 2, the communication control part 12 of the terminal device 1 may transmit location information independently even when the control part 11 of the terminal device 1 is not in operation. Therefore, for example, compared with a location obtaining method that uses a GPS application running on the terminal device 1, it is possible to obtain location information with less power. Furthermore, because there is no start-up time or operating time of an application, it is possible to swiftly obtain location information.

[b] Second Embodiment

According to a communication system described in a second embodiment, the broadcast information transmitted from a radio base station includes the ID of the radio base station. According to the second embodiment, the radio base station is, for example, an access point (AP) of a wireless local area network (LAN).

The AP of a wireless LAN is installed along with a router at a desired location by the owner of the AP, and is connected to the Internet by way of a provider used by the owner. When establishing a connection to a terminal device, the AP broadcasts its own ID to the terminal device, but the broadcast information transmitted from the AP does not include location information in coordinates.

According to the second embodiment, a communication system uses, as location information, the ID of a radio base station that does not have location information in coordinates by managing the ID of the radio base station in correlation with location information in coordinates using the management table described below.

Figure 9:
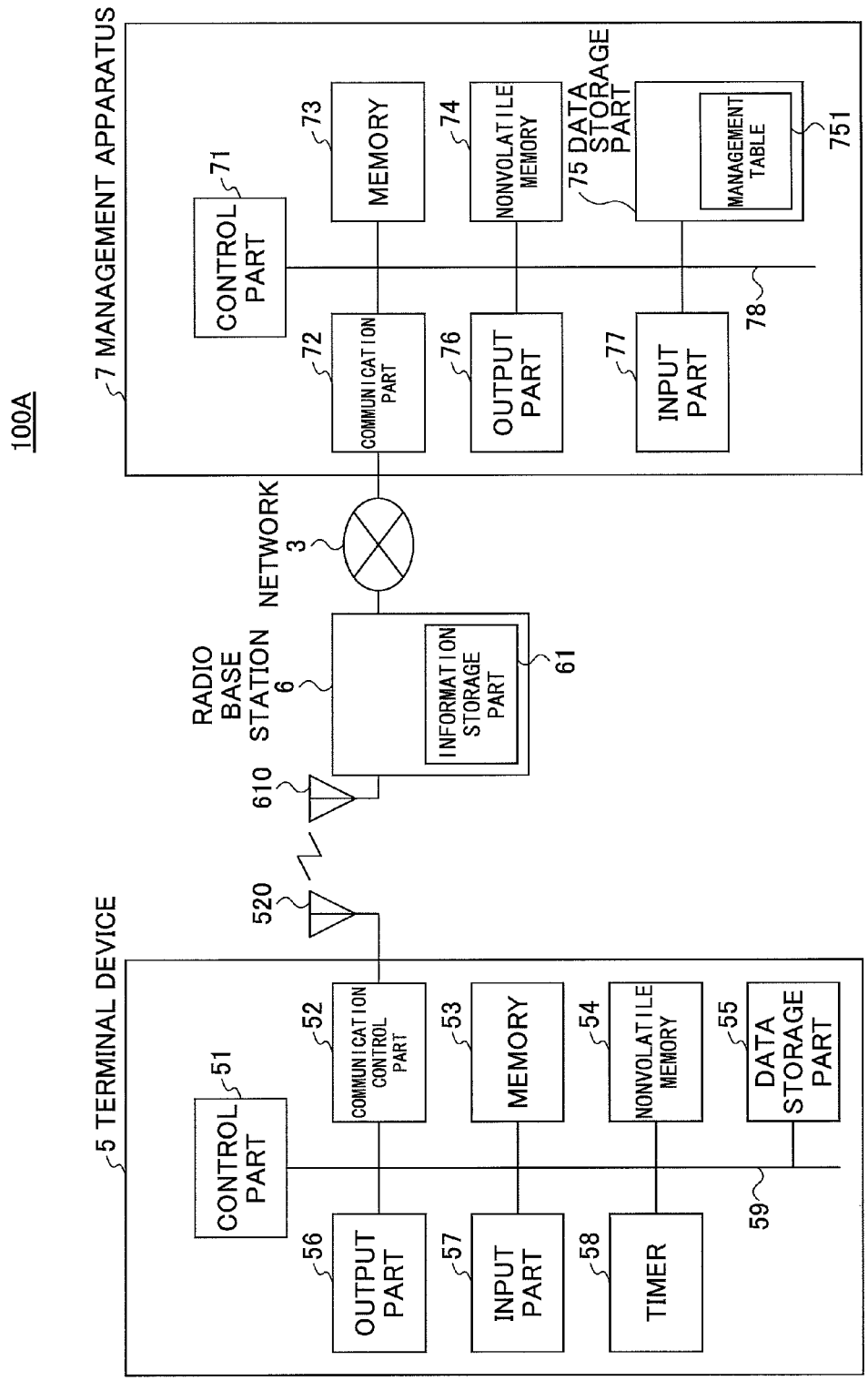
FIG. 9 is a diagram depicting a hardware configuration of a communication system according to a second embodiment.

FIG. 9 is a diagram depicting a hardware configuration of a communication system according to the second embodiment. The hardware configuration of the second embodiment is based on the hardware configuration of the first embodiment described above with reference to FIG. 1. Accordingly, only part of the hardware configuration of the second embodiment that causes a functional difference from the first embodiment is described, and a description of the other part may be omitted.

Referring to FIG. 9, a communication system 100A includes a terminal device 5, radio base stations 6, and a management apparatus 7 connected to the radio base stations 6 via the network 3. For simplification of description, only one radio base station 6 is depicted in FIG. 9. Hereinafter, the radio base stations 6 may be collectively referred to as "radio base station 6" when, for example, a structure or operation common to the radio base stations 6 is described and no distinction is made between the radio base stations 6.

The terminal device 5 is a wireless LAN client. The radio base station 6 is, for example, an AP of a wireless LAN. The AP of a wireless LAN may provide a router function that enables connection of multiple wireless LAN clients. Wireless LAN communications are established by, for example, authenticating wireless LAN clients with a service set ID (SSID) or an extended SSID (ESSID) set in the AP. The terminal device 5 includes a control part 51, a communication control part 52, a memory 53, a nonvolatile memory 54, a data storage part 55, an output part 56, an input part 57, and a timer 58, which are interconnected by a bus 59 that is also included in the terminal device 5. The control part 51, the communication control part 52, the memory 53, the nonvolatile memory 54, the data storage part 55, the output part 56, the input part 57, the timer 58, and the bus 59 may correspond to the control part 11, the communication control part 12, the memory 13, the nonvolatile memory 14, the data storage part 15, the output part 16, the input part 17, the timer 18, and the bus 19, respectively, of the terminal device 1 of the first embodiment. A radio antenna 520 connected to the communication control part 52 may correspond to the radio antenna 120 of the first embodiment.

The radio base station 6 includes an information storage part 61, which may correspond to the information storage part 21 of the radio base station 2 of the first embodiment. The radio base station 6 further includes a radio antenna 610, which may correspond to the radio antenna 210 of the radio base station 2 of the first embodiment.

The management apparatus 7 includes a control part 71, a communication part 72, a memory 73, a nonvolatile memory 74, a data storage part 75, an output part 76, and an input part 77, all of which are interconnected by a bus 78 that is also included in the management apparatus 7. The control part 71, the communication part 72, the memory 73, the nonvolatile memory 74, the data storage part 75, the output part 76, the input part 77, and the bus 78 may correspond to the control part 41, the communication part 42, the memory 43, the nonvolatile memory 44, the data storage part 45, the output part 46, the input part 47, and the bus 48, respectively, of the management apparatus 4 of the first embodiment. According to the second embodiment, however, the data storage part 75 further includes a management table 751. The management table 751 is a data table that manages the location information of the radio base station 6 that does not have location information. The management table 751 manages the ID of the radio base station 6 and its corresponding location information in correlation with each other.

Figure 10:
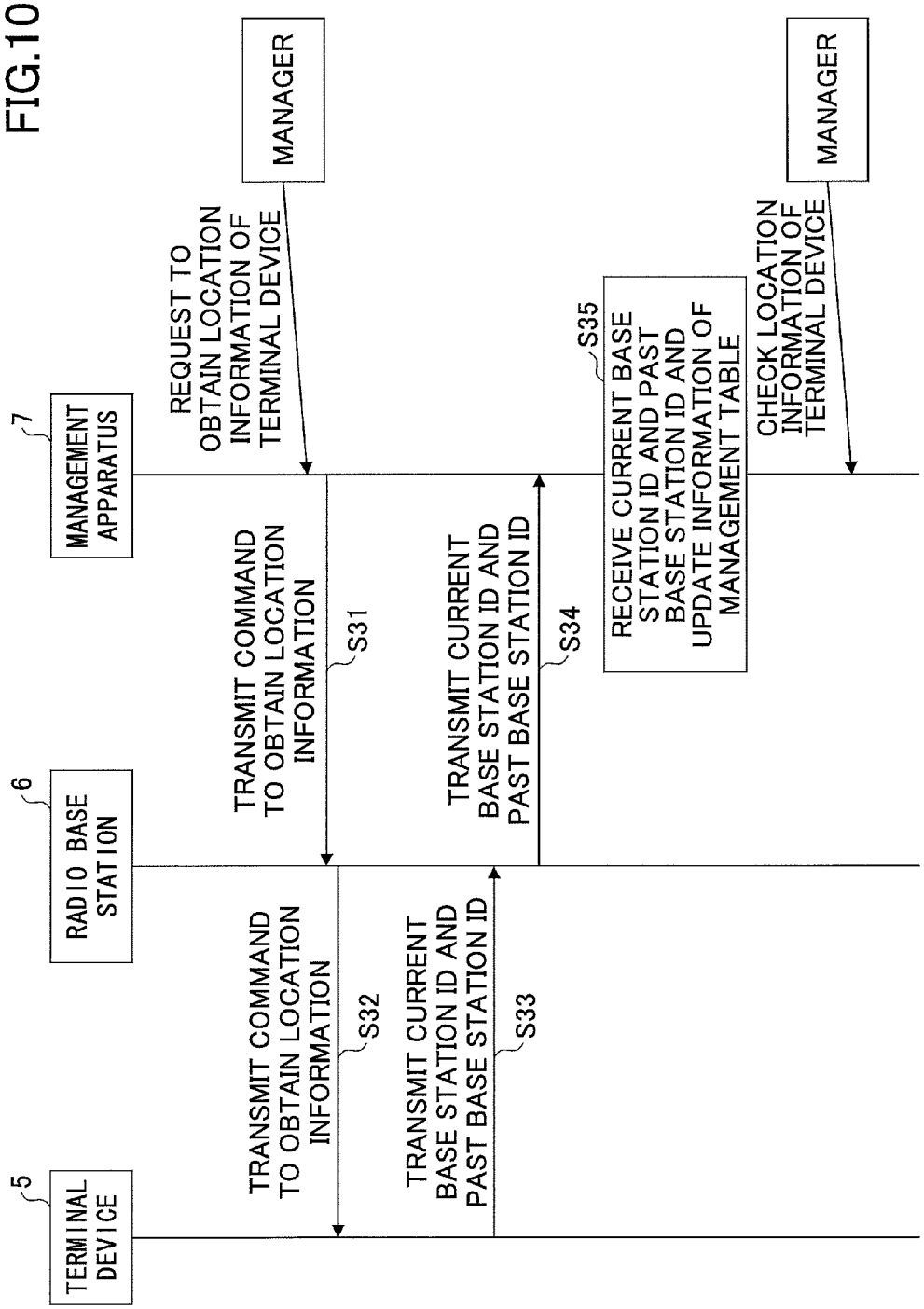
FIG. 10 is a sequence diagram depicting a procedure for obtaining the ID of a radio base station.
Figure 11:
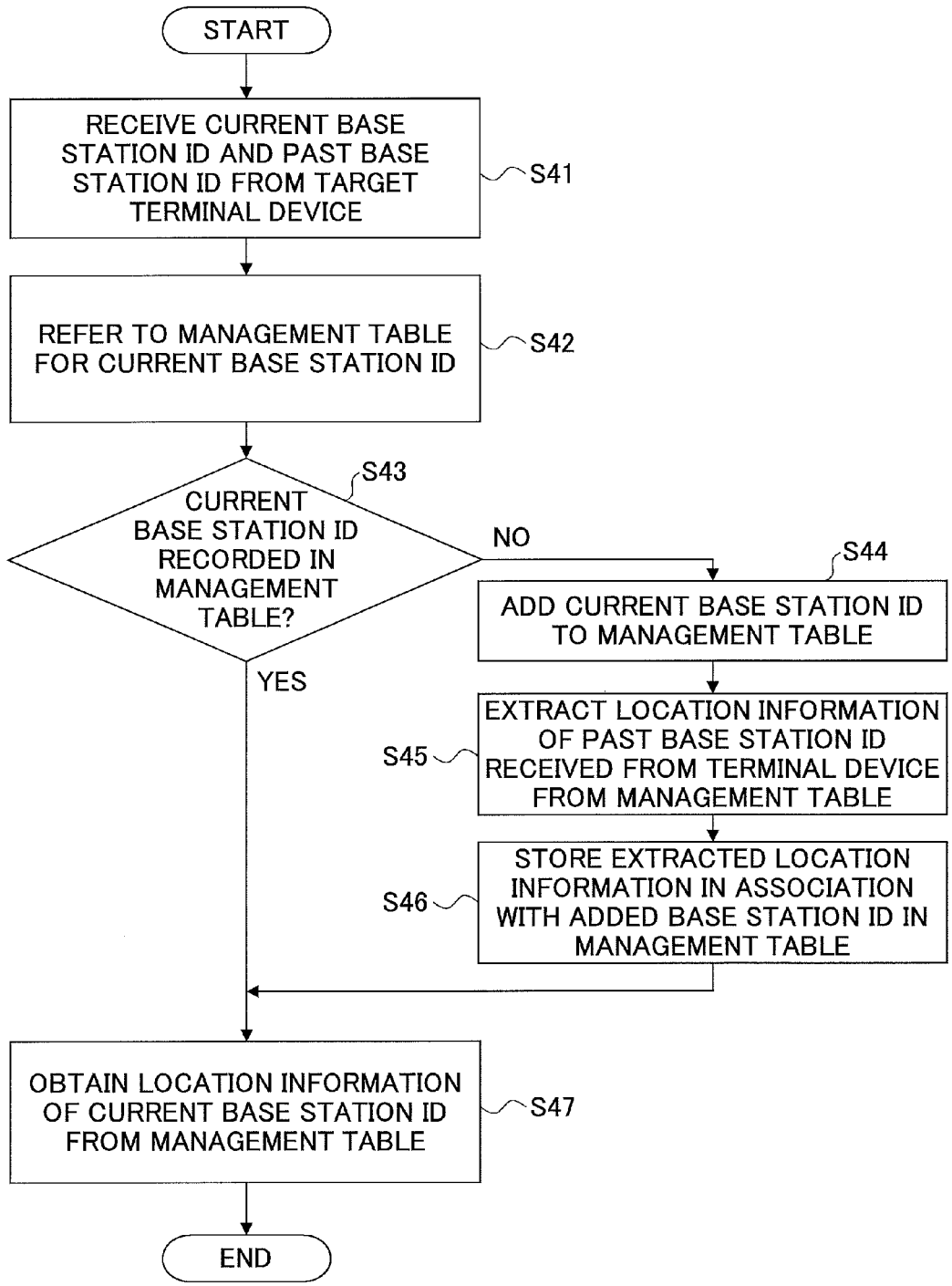
FIG. 11 is a flowchart depicting a method of obtaining location information and updating a management table in a management apparatus.

Next, a method of managing location information using the management table 751 according to the second embodiment is described with reference to FIGS. 10 through 13C. FIG. 10 is a sequence diagram depicting a procedure for obtaining the ID of the radio base station 6. FIG. 11 is a flowchart depicting a method of obtaining location information and updating the management table 751 in the management apparatus 7. FIGS. 12A through 12C are diagrams depicting a transition of information stored in the management table 751. FIGS. 13A through 13C are diagrams depicting a transition of the IDs of the radio base stations 6 stored in the communication control part 52 of the terminal device 5.

Referring to FIG. 10, like in FIG. 8 described in the first embodiment, at steps S31 and S32, a command to obtain location information is transmitted from the management apparatus 7 to the terminal device 5 that is an object of location information management. Here, it is possible for the management apparatus 4 to establish a connection line by calling the terminal device 1 according to the first embodiment. According to the second embodiment, however, because the radio base station 6 is, for example, an AP of a wireless LAN, it is not possible for the management apparatus 7 to make a call. Therefore, the transmission of a command at step S31 is performed after the TCP (transmission control protocol) connection from the terminal device 5 to the management apparatus 7 is established, for example.

The communication control part 52 of the terminal device 5 that receives the command to obtain location information has the same hardware configuration as that of the communication control part 12 of the first embodiment as depicted in FIG. 2. Thus, the communication control part 52 includes the memory 122 including the first storage part 1221 and the second storage part 1222. Referring to FIGS. 13A through 13C, the base station information of the radio base station 6 currently in communication is stored in the first storage part 1221, and the base station information of the radio base station 6 of past communications is stored in the second storage part 1222. While the base station information may include location information according to the first embodiment, the base station information stored in the communication control part 52 in FIGS. 13A through 13C includes no location information but includes the identification information (ID) of an AP because the radio base station 6 is, for example, an AP of a wireless LAN according to the second embodiment.

FIG. 13A depicts a case where the terminal device 5 is in communication with an AP of "ID1." In this case, "ID1" is stored as current base station information, and no information is stored as past base station information.

FIG. 13B illustrates a case where the terminal device 5 has moved to be in communication with an AP of "ID2." In this case, "ID2" is stored as current base station information, and "ID1" is stored as past base station information. Thus, the base station information has transitioned from the state of FIG. 13A.

FIG. 13C illustrates a case where the terminal device 5 has further moved to be in communication with an AP of "ID3." In this case, "ID3" is stored as current base station information, and "ID2" is stored as past base station information. Thus, the base station information has transitioned from the state of FIG. 13B.

By storing the history of the radio base stations 6 with which the terminal device 5 has communicated by storing current base station information and past base station information in the first storage part 1221 and the second storage part 1222, respectively, it is possible for the terminal device 5 to store information indicating the proximity of the location of the radio base station 6 currently in communication to the location of the radio base station 6 of past communications.

Referring back to FIG. 10, in response to reception of the command to obtain location information, at step S33, the terminal device 5 transmits the ID of current base station information and the ID of past base station information described with reference to FIGS. 13A through 13C to the radio base station 6. At step S34, the radio base station 6 transmits the base station information received from the terminal device 5 to the management apparatus 7.

In response to reception of the base station information, at step S35, the management apparatus 7 updates the information of the management table 751. Here, the method of updating the management table 751 at step S35 is described in detail using the flowchart of FIG. 11 and the transition of the management table 751 depicted in FIGS. 12A through 12C.

Referring to FIG. 11, at step S41, the management apparatus 7 receives the ID of current base station information and the ID of past base station information from the terminal device 5 that is an object of location information management. Then, at step S42, the management apparatus 7 refers to the management table 751 for the ID of current base station information. Then, at step S43, the management apparatus 7 determines whether the received base station ID is recorded in the management table 751.

Referring to FIG. 12A, it is assumed that location information "X1, Y1" and location information "X3, Y3" are recorded with respect to the radio base station 6 whose ID is "ID1" and the radio base station 6 whose ID is "ID3," respectively. The location information may be input in advance through the input part 77 of the management apparatus 7, for example.

When the base station information received at step S41 is "ID1" of current base station information with no past base station information as described with reference to FIG. 13A, "ID1" is recorded in the management table 751 (YES at step S43). Therefore, at step S47, the management apparatus 7 obtains the location information "X1, Y1" of "ID1" that is the ID of current base station information from the management table 751, and ends the process for obtaining location information.

Meanwhile, when the terminal device 5 moves to enter the state depicted in FIG. 13B, and the current base station information received at step S41 is "ID2," "ID2" is not recorded in the management table 751 (NO at step S43). Therefore, at step S44, the management apparatus 7 adds "ID2" of the current base station information to the management table 751. Here, because the past base station information received from the terminal device 5 together with "ID2" that is current base station information is "ID1," at step S45, the management apparatus 7 associates the radio base station 6 of "ID2" with the radio base station 6 of "ID1" and extracts the location information of "ID1" that is already stored in the management table 751. Then, at step S46, the management apparatus 7 stores the location information "X1, Y1" of "ID1" for added "ID2" in the management table 751. FIG. 12B depicts the state of the management table 751 where "ID2" is newly added and the location information of "ID1" is input for "ID2."

At step S47, the management apparatus 7 obtains the location information "X1, Y1" from the management table 751 as the location information of "ID2."

Furthermore, FIG. 12C depicts a case where the terminal device 5 further moves to an AP of "ID3." Because the current base station information "ID3" received from the terminal device 5 is already registered with the management table 751 (YES at step S43), at step S47, the management apparatus 7 obtains the location information "X3, Y3" of "ID3" stored in the management table 751, and adds no new radio base station 6.

According to this embodiment, the current base station information and the past base station information are associated based on the information received from a single terminal device 5. Alternatively, the location information may be corrected based on information received from multiple terminal devices 5. For example, it is assumed that the location information of "IDa," the location information of "IDb," and the location information of "IDc" are received from other terminal devices 5 as past base station information with respect to the current base station information "ID2." In this case, the average of the coordinate positions of "IDa," "IDb," and "IDc" may be calculated and determined as the location information of "ID2" that is newly added to the management table 751.

Furthermore, the date and time of obtaining current base station information and the date and time of obtaining past base station information may be recorded in the terminal device 5, and the current base station information and the past base station information may be associated under a predetermined restriction on the dates and times of both current base station information and past base station information. For example, if the dates and times of both current base station information and past base station information are close, the locations of the current AP and the past AP are presumed to be close. On the other hand, if the dates and times of both current base station information and past base station information are remote, the current AP and the past AP are presumed to be distant from each other. In wireless LAN communications where it is not possible to continue communications by a handoff process, it is possible to prevent association of APs that are at significantly different positions by imposing a temporal restriction on the association.

Referring back to FIG. 10, the manager 4 checks the location information of the terminal device 5 of which the manager 4 is notified through the output part 76 of the management apparatus 7, and ends this procedure. It is possible to notify the manager of the location information associated with the ID of a newly added AP by the management apparatus 7 by displaying the associated location information in a color different from a color for displaying the location information of already recorded APs.

According to the second embodiment, it is possible to easily maintain the location information of a radio base station even in the case where the radio base station is an apparatus that does not have location information and is subject to frequent installation and removal, such as a wireless LAN AP.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A terminal device, comprising:
   a memory; and
   a processor coupled to the memory, the processor being configured to
   receive broadcast information of a radio base station currently in communication with the terminal device;
   store location information included in the received broadcast information in a first storage part; and
   transmit the location information stored in the first storage part to a management apparatus connected to the radio base station through a network,
   wherein the processor is configured to transmit the location information stored in the first storage part, when the radio base station currently in communication with the terminal device is switched from a first radio base station to a second radio base station and location information is absent in broadcast information of the second radio base station received by the terminal device.

2. The terminal device as claimed in claim 1, wherein the processor is configured to transmit the location information in response to reception of a predetermined command from the management apparatus.

3. The terminal device as claimed in claim 1, wherein the processor is further configured to store, in a second storage part, the location information stored in the first storage part when the radio base station currently in communication with the terminal device is switched from the first radio base station to the second radio base station.

4. The terminal device as claimed in claim 3, wherein the processor is configured to transmit the location information stored in the first storage part and the location information stored in the second storage part to the management apparatus.

5. The terminal device as claimed in claim 1, further comprising:
   an additional processor programmed to control an operation of the terminal device, wherein the processor operates while the additional processor is in sleep mode.

6. A communication method, comprising:

receiving, implemented by a computer processor, broadcast information of a radio base station currently in communication;

storing, implemented by the computer processor, location information included in the received broadcast information in a first storage part; and transmitting, implemented by the computer processor, the location information stored in the first storage part to a management apparatus connected to the radio base station through a network, wherein said transmitting transmits the location information stored in the first storage part, when the radio base station currently in communication is switched from a first radio base station to a second radio base station and location information is absent in broadcast information of the second radio base station received by said receiving.

7. The communication method as claimed in claim 6, wherein said transmitting transmits the location information in response to reception of a predetermined command from the management apparatus.

8. The communication method as claimed in claim 6, further comprising:

storing, implemented by the computer processor, in a second storage part, the location information stored in the first storage part when the radio base station currently in communication is switched from the first radio base station to the second radio base station.

9. The communication method as claimed in claim 8, wherein said transmitting transmits the location information stored in the first storage part and the location information stored in the second storage part to the management apparatus.

10. A non-transitory computer-readable recording medium having stored therein a program that causes a computer to execute a process, the process comprising:

receiving broadcast information of a radio base station currently in communication;

storing location information included in the received broadcast information in a first storage part; and transmitting the location information stored in the first storage part to a management apparatus connected to the radio base station through a network, wherein said transmitting transmits the location information stored in the first storage part, when the radio base station currently in communication is switched from a first radio base station to a second radio base station and location information is absent in broadcast information of the second radio base station received by said receiving.

11. The non-transitory computer-readable recording medium as claimed in claim 10, wherein said transmitting transmits the location information in response to reception of a predetermined command from the management apparatus.

12. The non-transitory computer-readable recording medium as claimed in claim 10, wherein the process further comprises:

storing, in a second storage part, the location information stored in the first storage part when the radio base station currently in communication is switched from the first radio base station to the second radio base station.

13. The non-transitory computer-readable recording medium as claimed in claim 12, wherein said transmitting transmits the location information stored in the first storage part and the location information stored in the second storage part to the management apparatus.

* * * * *